United States Patent [19]

Winbladh et al.

[11] Patent Number: 4,595,510

[45] Date of Patent: Jun. 17, 1986

[54] METHOD AND PLANT FOR COLLECTING OF OIL FLOATING ON WATER

[76] Inventors: Per Winbladh, Dalgårdsvägen 4, S-240 20 Furulunds Station; Gert Garin, Kulladalsgatan 12A, S-214 64 Malmö, both of Sweden

[21] Appl. No.: 336,647

[22] Filed: Jan. 4, 1982

Related U.S. Application Data

[63] Continuation-in-part of Ser. No. 55,727, Jul. 9, 1979, abandoned.

[51] Int. Cl.$^4$ .............................................. B01D 17/02
[52] U.S. Cl. .................................... 210/776; 210/799; 210/242.3; 210/923; 405/63
[58] Field of Search .................... 210/923, 242.3, 693, 210/776, 799; 405/60, 63

[56] References Cited

U.S. PATENT DOCUMENTS

| | | | |
|---|---|---|---|
| 3,726,406 | 4/1973 | Damberger | 210/776 |
| 3,850,807 | 11/1974 | Jones | 210/776 |
| 3,860,519 | 1/1975 | Weatherford | 210/923 |
| 3,951,810 | 4/1976 | Crisafull | 210/242.3 |
| 3,966,615 | 6/1976 | Petchul et al. | 210/776 |
| 3,980,559 | 9/1976 | Netzell | 210/923 |
| 4,119,541 | 10/1978 | Makaya | 210/776 |
| 4,191,650 | 4/1980 | Muneta | 210/242.3 |
| 4,257,889 | 4/1981 | Wöber et al. | 210/242.3 |
| 4,348,282 | 9/1982 | Fries et al. | 210/242.3 |
| 4,372,854 | 2/1983 | Szereday | 210/923 |

FOREIGN PATENT DOCUMENTS

| | | | |
|---|---|---|---|
| 2917614 | 11/1980 | Fed. Rep. of Germany | 210/242.3 |
| 47903 | 3/1979 | Japan | 210/242.3 |
| 47915 | 5/1979 | Japan | 210/242.3 |

*Primary Examiner*—Richard V. Fisher
*Assistant Examiner*—Wanda L. Millard
*Attorney, Agent, or Firm*—Ladas & Parry

[57] ABSTRACT

A method and a plant for recovery of oil spilled on a water surface. A marine vessel including a fore body and aft body and a bulwark is provided with a longitudinally extending edge at the deck from which the deck slopes downwards towards a substantially low bulwark which in operating position is below the water surface, thus leaving one side of the deck open to the sea. The sloping deck, the fore body, aft body and bulwark together form an artificial calm bay into which the oil slick can flow. The waves entering the calm bay break against the sloping deck and force the oil at the top of the waves over the edge and then into the interior of the vessel body, where the oil is settled and separated from the body of the water.

10 Claims, 4 Drawing Figures

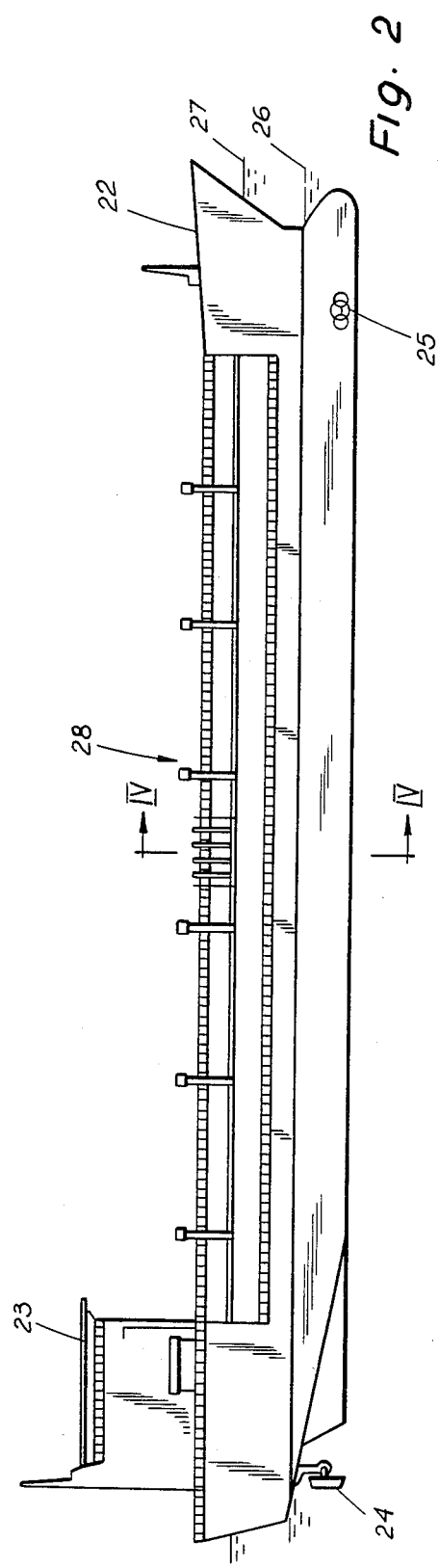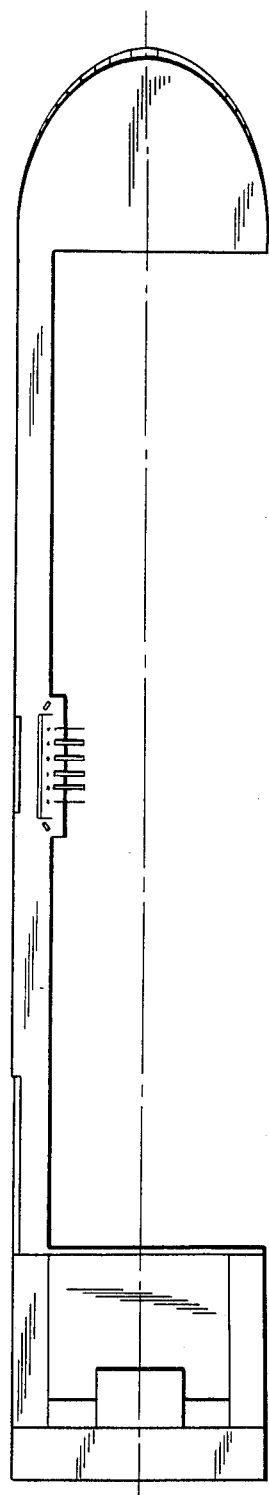

METHOD AND PLANT FOR COLLECTING OF OIL FLOATING ON WATER

CROSS-REFERENCE TO RELATED APPLICATION

This application is a continuation-in-part of application Ser. No. 55,727, filed July 9, 1979, now abandoned.

BACKGROUND OF THE INVENTION.

The present invention relates to a method and a plant for recovery of oil, spilled on a water surface.

In the event of a collision with or grounding of a tanker or an accident at an off-shore oil well the oil as a rule is spilled on the water surface. The tankers of today being enormous, the damage of an oil spill is devastating to beaches as well as to bird-life and fishing.

If a really big accident occurs, gathering and recovery of the oil spill is beyond the capacity of present technique. There is a certain readiness for minor accidents and spills but major accidents demand a technique yet unknown.

Oil spills on water have thus far often been fought by chemical means, in order to sink the oil into the sea and make it harmless. At a large cost the ocean surface is rendered free of oil slicks but instead the vegetation at the bottom is given a large addition of nutriment. This causes large changes in the ecological system.

In the event of major accidents, oil is spilled in large quantities representing a great economic value.

By mechanical recovery of oil spill today, booms are used to corral the oil slick and gather the oil to a layer of a thickness enough to enable mechanical collection from the water surface. The collection is performed either by suction or by means of skimmers.

UK patent specification No. 947 026 discloses a skimmer. This plant operates satisfactory but has too low an efficiency to be usable at big oil spills.

One of the problems which must be solved in collecting oil on a water surface is the fact that the oil is spread into a thin surface layer over a large area. In order to efficiently collect the oil, it is required that the oil layer is thickened. This is customary performed by means of oil booms arranged in the form of a V. The oil corralled by the booms is gathered at the apex of the V and the oil layer is thereby made thicker.

The collected mixture of oil and water is pumped by pumping means from the water surface to a separation vessel where the oil is settled or separated from the water. The water is given off to the surroundings.

U.S. Pat. No. 4,067,811 to Dallamore discloses an apparatus for separating floating pollutants, particularly oil, from a body of water. The appparatus comprises a vessel having an opening in its side to define an inlet for the mixture of the oil and the top water layer. There are means within the vessel to impart a whirlpool motion to the admitted mixture and a nozzle is positioned at about the center of the whirlpool means projecting upwardly. A separator is positioned beneath the nozzle and the oil is separated from the body of the water.

However, this apparatus is too sensitive to waves to be usable at the open sea. The inlet usually faces the waves and any wave entering the inlet will immediately disturb the whirlpool motion and move the whirlpool away from the nozzle.

U.S. Pat. No. 3,726,406 to Damberger discloses a skimmer body floating on the body of water by means of floatable members, the floatable members being of such a capacity as to support the skimmer body with the upper surface of the front floatable member underlying the oil to be collected. The oil slick is drawn to the oil skimmer body by a cable water fence. A vacuum pump removes the oil from the skimmer body into a separator and then to an oil tanker. A hot water spray head is arranged to heat the oil from beneath the same just immediately to its passing over the upper surface of the front floating body.

This device is also severely disturbed by wave motion.

SUMMARY OF THE INVENTION

The object of the present invention is to provide a method and a plant for recovering oil spilled on water and thus reducing the damages of oil catastrophes at sea. The recovery is carried out by mechanical means thus enabling the reuse of the collected oil and preventing unnecessary spreading of chemicals.

It is known that when spilled oil reaches a beach, it is gathered in calm bays and can reach a considerable thickness at such places. A calm bay is characterized by the fact that it is surrounded by land on at least three sides and the fourth side is open to the sea. Moreover, the bay is relatively shallow and its bottom slowly inclines. These conditions are reproduced in the present invention in order to gather the oil to a greater depth. The provision of a calm bay makes it possible to achieve a pre-separation and a gathering even before the oil enters the separator.

According to the invention there is provided a method for recovering oil floating on water in a layer comprising the step of (a) floating a container in the water having a substantial portion of the container below the water surface, (b) the container including an upper surface positioned below or close to the water surface and a collar surrounding the container at substantially three sides leaving the fourth side open, the collar and the upper surface together forming the sides and bottom of an artificial calm bay, (c) adjusting the depth and orientation of the container so as to bring the container to a disposition having an upper edge of the upper surface positioned at substantially the level of the boundary between the water and the layer of oil, (d) the upper surface including at the open side a sloping or inclined surface extending from the open side and upwards to said edge, (e) bringing the waves entering the open side to break against the sloping surface and forcing the oil at the top of the waves over said edge, (f) introducing the mixture of oil and water passing over said edge to the interior of the container and separating the oil from the water in the interior of the container and discharging the separated water to the surroundings, According to the invention there is also provided a plant for recovering oil spilled on water comprising (a) a settling container including an upper surface positioned below or close to the water surface, (b) a collar surrounding the container at substantially three sides leaving the fourth side open, the collar and said upper surface together forming the sides and bottom of an artificial calm bay, (c) the upper surface including an upper edge and a portion sloping downwards from said edge and towards the open side, (d) means for adjusting the depth, tilt and inclination of the container so as to adjust the slope of said sloping portion and the height of said upper edge so that waves entering the container through the open fourth side break against the sloping portion and pass the oil over said edge, (d) the upper surface including a means for introducing the oil and water passing said edge to the interior of the container, (e) means for separating the oil from the body of water inside the container.

According to the preferred embodiment, the plant is a marine vessel.

BRIEF DESCRIPTION OF THE DRAWINGS

Two embodiments of the present invention will be described below with reference to the drawings to illustrate the invention.

FIG. 2 is a side view of a semi-submersible vessel according to the invention.

FIG. 3 is a plan view of the vessel according to FIG. 2.

DESCRIPTION OF THE PREFERRED EMBODIMENTS

Figure 1:
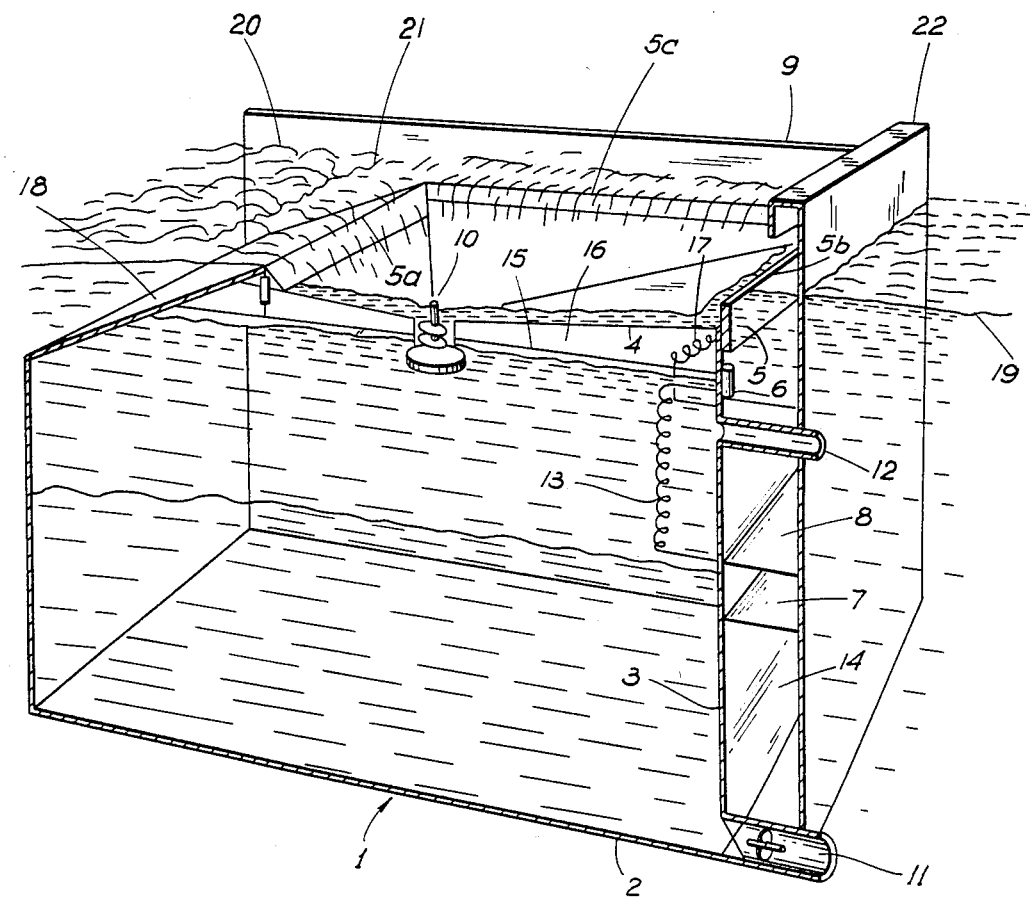
FIG. 1 is a cross-section in perspective of a container according to the invention.

FIG. 1 shows a container according to the invention. The container comprises a closed casing 1 having a lower surface 2, side walls 3, and an upper, preferably partially funnel-shaped surface or collecting table 4. The funnel-shaped surface is bounded by an adjustable edge 5 which can be set vertically by pneumatic or hydraulic pistons. The casing is surrounded by ballast tanks 14, trim tanks 7 and compensation tanks 8 for controlling the draught and tilt of the container. The casing is surrounded by an outer collar 9 which encircles the adjustable edge 5 at a certain distance therefrom. The outer collar 9 extends around at most three sides of the container leaving the fourth side (left side of FIG. 1) open as an inlet for oil and water.

In the center of the collecting table 4 there is a hole 10 through which oil and water can pour down into the container beneath. The container is mainly filled with water. When oil and water flow down into the container surplus water is discharged at the same time through a lower pipe 11 to keep the liquid at a constant level. In the container the oil separates from the water and is pumped out through a pipe connection 12 to an accompanying tanker or another tank. The container is optionally equipped with a heating coil 13 in order to lower the viscosity and enable pumping of the oil. The outlet 12 and inlet 10 can be adapted with pumps and non-return valves to guide the flow into and out of the container. The outlet 11 has a level indicator and a shut-off valve (not shown) to control the quantity of liquid in the container. Beneath the collecting table 4 of the container there is an essentially horizontal partition 15, which together with said upper surface forms a tank 16 filled with a fluid, preferably an inert gas, such as nitrogen. The tank includes optionally a heating coil 17 for heating the upper surface 4 to a higher temperature than the remaining content of the container. Thereby the viscosity of the oil on the funnel-shaped surface 4 is lowered and the flowing of the oil through the hole 10 facilitated. The heating coils 13 and 17 can be activated at different times on demand.

At the inlet side of the container (to the left in FIG. 1) there is a sloping plate 18 facing the waves.

The operation of the container of FIG. 1 will be described below.

The container is placed in the sea with essentially merely the collar 9 extending above the water surface 19 and the open side facing the oil slick. The container is placed leewards the oil slick so that the oil slick drifts towards the container. Since the waves move in the direction of the wind they will enter the container from the left in FIG. 1. Since almost the whole container is below the water surface it is called a submersible or semi-submersible body and is essentially unaffected by the waves and remains in a relatively stationary position in the sea.

A wave 20 entering the container will be disturbed by the sloping bottom plate 18 and the wave will break as indicated at 21, which means that the oil at the top of the wave will be moved above the edge 5a at the end of the plate 18 and to the collecting table.

In the case of a large wave entering the container it will simply continue above and beyond the edge 5a and over the collecting table 4 and reach the collar 9 at the right side of the container, where the collar is provided with a wave stopping means 22 which finally stops the large wave. The oil transported by the wave will thereafter flow over the right side edge 5b while the water will flow back through the channel formed between the collar 9 and the edge 5c.

Figure 4:
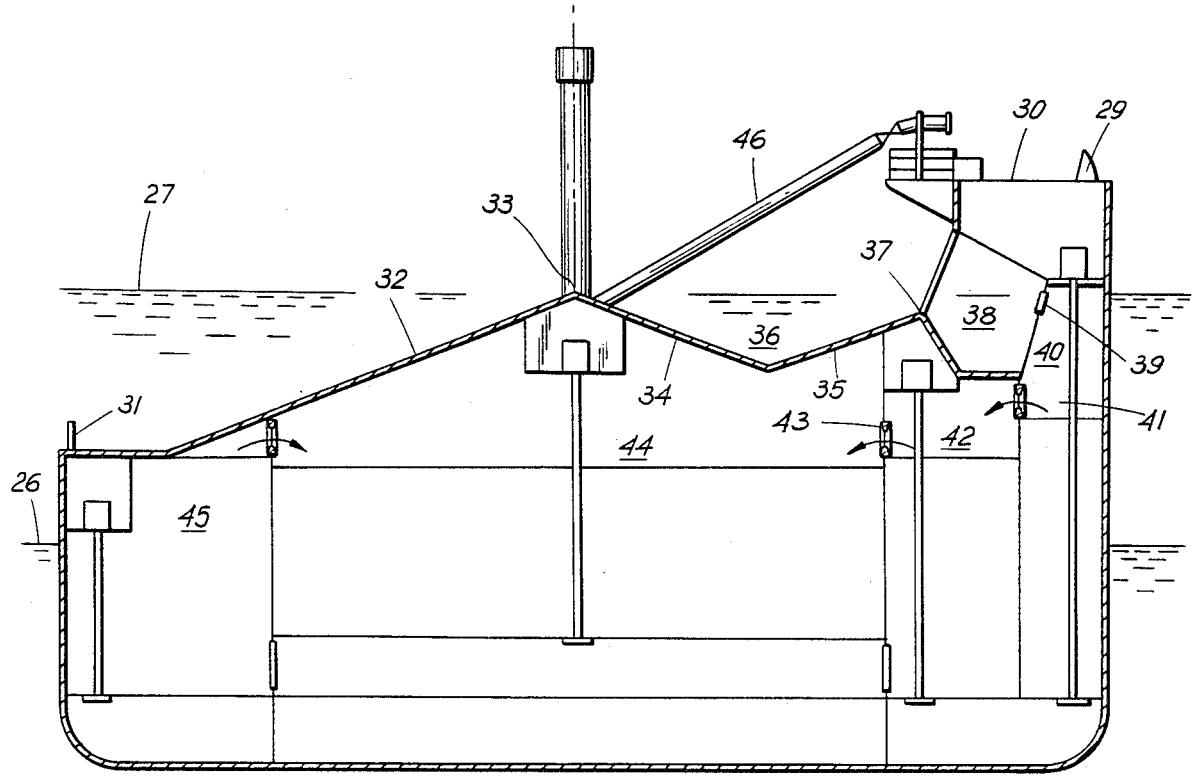
FIG. 4 is a sectional view taken along the line IV—IV of FIG. 2.

While a first embodiment of the invention has been disclosed with reference to FIG. 1 in order to explain the principles of the invention which embodiment is suitable to recover small oil slicks and to operate close to the coast, FIGS. 2 to 4 show a preferred embodiment where the invention is implemented on a vessel for marine use.

FIGS. 2 and 3 show the vessel comprising a fore body 22 and an aft ship body 23. These bodies harbour a power producing unit which delivers power to maneuvering devices 24, 25. Furthermore, the vessel has conventional equipment like engine, rudder, screw etc.

The vessel is adapted to be operated in two positions, one transport position where the main body 28 of the vessel is above the water surface 26 and one operating position where the main body is below the water surface 27 (see FIG. 4) and the vessel is of a semi-submersible type.

The main body is at the right side in FIG. 4 and is provided with a bulwark 29 and a passage 30. At the left side there is a small bulwark 31 which, when in operating position, is several meters below the water surface.

Toward the left side of FIG. 4 there is a first inclined plate 32 which extends upwards to the middle or centrum line 33 of the vessel. A second inclined plate 34 extends downwardly to the right and a third inclined plate 35 extends upwardly. The second and third plate 34, 35 form a V-shaped region 36.

When a wave enters the vessel from the left in FIG. 4, it breaks due to the inclined plate 32 and the wave forces the surface layer including oil over the edge 33 to the V-shaped region 36. This region receives a mixture of oil and water, where the wave action has increased the oil portion considerably. The mixture included in region 36 passes over an edge 37 into a channel 38 and then through first openings 39 to a first compartment 40 and then through second openings 41 to a second compartment 42, and then through third openings 43 to a third compartment 44. The second compartment 42 extends around the vessel and communicates with a compartment 45 at the left side in FIG. 4.

It will be understood that the oil separates from the body of the water in the region 36, the channel 38 and the compartments 40, 42, 44, 45 and that separated water is discharged from the bottom of each compartment. The channel 38 and the region 36 can also include means for discharging water at the bottom of the channel 38 and the region 36.

Thus, it will be understood that combination of the inclined surface 32, the fore ship body 22, the aft ship body 23 and the bulwark 29 forms a calm bay. The waves break and roll over the edge 33 and the mixture of oil and water passing the edge is allowed to separate in the interior of the vessel.

In FIG. 4, the height of edge 33 is shown to be equal to the calm water surface 27. However, the height of this edge is adjusted by means of trim tanks so that it can be somewhat higher than shown. Moreover, the inclination of the plate 32 is adjusted, depending on the weather, so that the wave breaking point is not too far from the edge 33. This adjustment is made by tilting the entire vessel body. It is also possible to add means for separably adjusting the inclination of the plate 32 and the height of the edge 33. It is also essential that the left portion of the inclined plate 32, as shown in FIG. 4 is at such a depth below the water surface that it does not initially disturb the waves entering the calm bay which could result in reflected waves disturbing the operation discussed above. It is also essential that the vessel does not possess any substantial wind deflection surfaces disturbing the wind blowing towards the calm bay since this wind blows the oil slick into the calm bay.

The vessel as shown in FIGS. 2 to 4 includes pipe means 46 necessary for discharging the collected oil after a recovery at sea.

What is claimed is:

1. A method for recovering oil floating on water in a layer comprising the steps of:

floating a container in the water, the container including an upper surface positioned partially below the water surface and a collar surrounding substantially three sides of the container leaving the fourth side open, the collar and the upper surface together integrally forming the sides and bottom respectively of an artificial calm bay, the upper surface comprising a first surface immovably affixed to said container, sloping upwards from the fourth open side from a front edge positioned far below the water surface towards an upper edge substantially parallel to the open side, and a second surface sloping downwards from said upper edge, the container further having a small portion thereof extending above the water surface and a substantial portion thereof reaching far below the water surface, whereby the container is affected in position and orientation only to a limited extent by motions in and above the surface of the water, including wave motions, surface streams and wind action;

adjustably ballasting the depth and inclination of the container in accordance with wave height so as to bring the container to a disposition having an upper edge of the upper surface positioned at substantially the level of the boundary between the water and the layer of oil, so that waves entering the open side gradually are affected by the first surface in order to transform essentially vertical movements of particles of the water into an elliptical movement having an essentially horizontal movement component at the water surface towards the upper edge in order to force oil floating on the surface over said upper edge to said second surface without a substantial portion of water;

introducing the mixture of oil and water passing over said upper edge to the interior of the container;

permitting the oil and water to separate in the container; and discharging the separated water to the surroundings.

2. A method as claimed in claim 1, further comprising the step of adjusting the height of said edge over said upper surface of the container.

3. A method as claimed in claim 1 in which said front edge is positioned below the water surface by a distance substantially greater than the wave height.

4. A method as claimed in claim 1 in which the container is floated so that it is stationary in the water.

5. A plant for recovering oil spilled on water comprising:

a settling container for floatation in the water, the container having a small portion thereof for positioning above the water surface and a substantial portion thereof for reaching far below the water surface, whereby the container is affected in position and orientation only to a limited extend by motions in and above the surface of the water, including wave motions, surface streams and wind action;

the container including an upper surface for positioning partially below the water surface and a collar surrounding the container at substantially three sides leaving the fourth side open, the collar and said upper surface together integrally forming the sides and bottom respectively of an artificial calm bay;

the upper surface comprising a first surface immovably affixed to said container sloping upwards from the fourth open side from a front edge positioned far below the water surface towards an upper edge substantially parallel to the open side and a second surface sloping downwards from said upper edge;

a means for adjustably ballasting the depth and inclination of the container so as to bring the container to a disposition having an upper edge of the upper surface positioned at substantially the level of the boundary between the water and the layer of oil so that waves entering the container through the fourth side gradually are affected by the first surface in order to transform essentially vertical movements of particles of the water into an elliptical movement having an essentially horizontal movement component at the water surface towards the upper edge in order to force oil floating on the surface over said upper edge to said second surface without a substantial portion of water;

the second surface having means for introducing the oil and water passing said upper edge to the interior of the container; and means for separating the oil from the water inside the container.

6. A plant as claimed in claim 5, wherein the container is a marine vessel including a main body, a foreship body and an aft-ship body and a bulwark which together form said collar.

7. A plant as claimed in claim 6, wherein the marine vessel is operated in two position, one transport position wherein the main body of the vessel is above the water surface and one operating position where the main body is below the water surface and the vessel is of a semi-submersible type.

8. A plant as claimed in claim 7, wherein the deck of the main body includes a longitudinally extending edge from which the deck slopes sidewards and downwards in order to form said first surface.

9. A plant as claimed in claim 5 in which said front edge is positioned below the water surface by a distance substantially greater than the wave height.

10. A plant is claimed in claim 5 in which said settling tank is floated so as to be stationary in the water.

* * * * *